US012297671B2

(12) United States Patent
Cervone et al.

(10) Patent No.: US 12,297,671 B2
(45) Date of Patent: May 13, 2025

(54) VEHICULAR DOOR HANDLE ASSEMBLY

(71) Applicant: Magna Mirrors of America, Inc., Holland, MI (US)

(72) Inventors: Connor G. Cervone, Byron Center, MI (US); Justin E. Sobecki, Rockford, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 241 days.

(21) Appl. No.: 18/047,679

(22) Filed: Oct. 19, 2022

(65) Prior Publication Data

US 2023/0124910 A1 Apr. 20, 2023

Related U.S. Application Data

(60) Provisional application No. 63/262,765, filed on Oct. 20, 2021.

(51) Int. Cl.

| | |
|---|---|
| ***E05B 81/76*** | (2014.01) |
| ***E05B 79/06*** | (2014.01) |
| ***E05B 85/10*** | (2014.01) |

(52) U.S. Cl.
CPC .............. *E05B 81/76* (2013.01); *E05B 79/06* (2013.01); *E05B 85/10* (2013.01)

(58) Field of Classification Search
CPC .......... E05B 81/76; E05B 81/77; E05B 85/10; Y10S 292/37; Y10T 292/03; Y10T 292/0964; Y10T 292/0977; Y10T 292/101; Y10T 292/1016; H01H 15/00; H01H 15/02; H01H 13/14; H01H 13/50; H01H 13/52; H01H 2013/525
See application file for complete search history.

(56) References Cited

U.S. PATENT DOCUMENTS 2,927,814 A * 3/1960 Reitzel .................... E05B 65/52 24/656
4,331,844 A * 5/1982 Saitoh .................... H01H 15/02 200/16 R (Continued)

FOREIGN PATENT DOCUMENTS

CN 107507724 A * 12/2017 ............. H01H 13/52
CN 207367841 U * 5/2018 ............. H01H 13/52

(Continued)

*Primary Examiner* — Carlos Lugo
(74) *Attorney, Agent, or Firm* — HONIGMAN LLP

(57) ABSTRACT

A vehicular exterior door handle assembly includes a bracket configured to mount at a vehicular door, a handle portion mounted at the bracket, and a switch mechanism disposed at the handle portion that includes a trigger element movably disposed within a housing. The housing includes an inner portion and an outer portion. When a force is applied at the outer portion, the outer portion moves toward the inner portion. The outer portion of the housing is configured to engage the trigger element as the outer portion moves toward the inner portion. As the outer portion moves toward the inner portion and the outer portion engages the trigger element, the trigger element moves within the housing in a second direction at an angle relative to the first direction and engages a microswitch disposed within the housing to actuate the switch mechanism to operate to release a latch mechanism of the door.

29 Claims, 8 Drawing Sheets

(56) References Cited

U.S. PATENT DOCUMENTS

| | | | | |
|---|---|---|---|---|
| 6,088,531 | A * | 7/2000 | Endoh | H01H 13/06 396/29 |
| 6,349,450 | B1 * | 2/2002 | Koops | E05B 85/10 292/336.3 |
| 6,550,103 | B2 | 4/2003 | Koops et al. | |
| 6,626,473 | B1 * | 9/2003 | Klein | B29C 45/1676 292/347 |
| 6,907,643 | B2 | 6/2005 | Koops et al. | |
| 6,977,619 | B2 | 12/2005 | March et al. | |
| 7,407,203 | B2 * | 8/2008 | Huizenga | E05B 79/20 292/347 |
| 7,777,141 | B2 * | 8/2010 | Ishiguro | E05B 81/76 200/341 |
| 7,938,460 | B2 * | 5/2011 | Ishiguro | E05B 81/76 292/336.3 |
| 8,309,870 | B2 * | 11/2012 | Peterson | H01H 13/85 200/344 |
| 8,333,492 | B2 * | 12/2012 | Dingman | B60Q 1/26 362/399 |
| 8,786,401 | B2 * | 7/2014 | Sobecki | E05B 81/34 340/5.1 |
| 8,801,245 | B2 * | 8/2014 | De Wind | B60Q 1/2696 455/420 |
| 9,464,710 | B2 * | 10/2016 | Takeda | H01H 13/14 |
| 9,543,090 | B2 * | 1/2017 | Krumpelman | H01H 13/14 |
| 9,741,505 | B2 * | 8/2017 | Choi | H01H 13/14 |
| 10,147,567 | B2 * | 12/2018 | Poon | H01H 13/26 |
| 11,066,856 | B2 * | 7/2021 | Bonucci | H01H 13/14 |
| 2002/0046439 | A1 * | 4/2002 | Agostini | E05B 81/76 16/110.1 |
| 2010/0007463 | A1 * | 1/2010 | Dingman | E05B 81/78 340/425.5 |
| 2010/0088855 | A1 * | 4/2010 | Ruse | E05B 77/06 16/412 |
| 2018/0254720 | A1 * | 9/2018 | Ohishi | H03K 17/964 |

FOREIGN PATENT DOCUMENTS

| | | | | |
|---|---|---|---|---|
| DE | 102004025054 | A1 * | 12/2005 | E05B 81/76 |
| DE | 102008032820 | A1 * | 1/2010 | E05B 81/76 |
| DE | 102014218996 | A1 * | 3/2015 | H01H 15/02 |
| DE | 102018222304 | A1 * | 6/2020 | E05B 81/76 |
| EP | 2088267 | A2 * | 8/2009 | E05B 39/007 |
| EP | 2314803 | A2 * | 4/2011 | E05B 77/34 |
| JP | 2016139589 | A * | 8/2016 | H01H 15/02 |

* cited by examiner

| # | Part |
|---|---|
| 1 | Bezel |
| 2 | Trim Seal |
| 3 | Rubber Seal |
| 4 | Push Housing |
| 5 | Trigger Ramp |
| 6 | Switch |
| 7 | Spring |
| 8 | Lower Housing |

VEHICULAR DOOR HANDLE ASSEMBLY

CROSS REFERENCE TO RELATED APPLICATION

The present application claims the filing benefits of U.S. provisional application Ser. No. 63/262,765, filed Oct. 20, 2021, which is hereby incorporated herein by reference in its entirety.

FIELD OF THE INVENTION

The present invention relates to door handles for vehicles and, more particularly, to an exterior door handle for opening a side door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door. It is also known to provide a static door handle, where the handle portion is fixedly attached or mounted relative to the base portion and a user actuates the latch mechanism to release the latch and open the door by grasping the handle portion.

SUMMARY OF THE INVENTION

A door handle assembly for a door of a vehicle includes a handle portion fixedly mounted at a door of a vehicle. For example, the handle portion may be fixedly mounted or attached at a base or mounting bracket at the door. The handle portion includes a switch mechanism, whereby actuation of the switch mechanism by a user releases a latch mechanism of the door to open the door. The switch mechanism is actuated when a user applies a force or input at an outer surface of the switch mechanism and the switch mechanism includes a multi-ramped trigger element so that it may be actuated by a user pressing at different locations along the outer surface of the switch mechanism.

For example, the switch mechanism may include an outer portion or button portion or outer or upper housing configured to receive a user input for actuating the switch mechanism. When the user presses the outer housing, protrusions at an inner side of the outer housing engage ramps of a trigger element of the switch mechanism and the protrusions at the inner side of the outer housing travel down the ramps of the trigger element. As the protrusions at the inner side of the outer housing travel down the ramps of the trigger element, the trigger element moves laterally and engages a microswitch of the switch mechanism to actuate the microswitch. When the microswitch is actuated, the latch mechanism of the door is released to open the door. The protrusions at the inner side of the outer housing and the ramps of the trigger element may span substantially the width of the switch mechanism so that a user input may be received substantially across the width of the switch mechanism to actuate the switch mechanism.

These and other objects, advantages, purposes and features of the present invention will become apparent upon review of the following specification in conjunction with the drawings.

DESCRIPTION OF THE PREFERRED EMBODIMENTS

Figure 1:
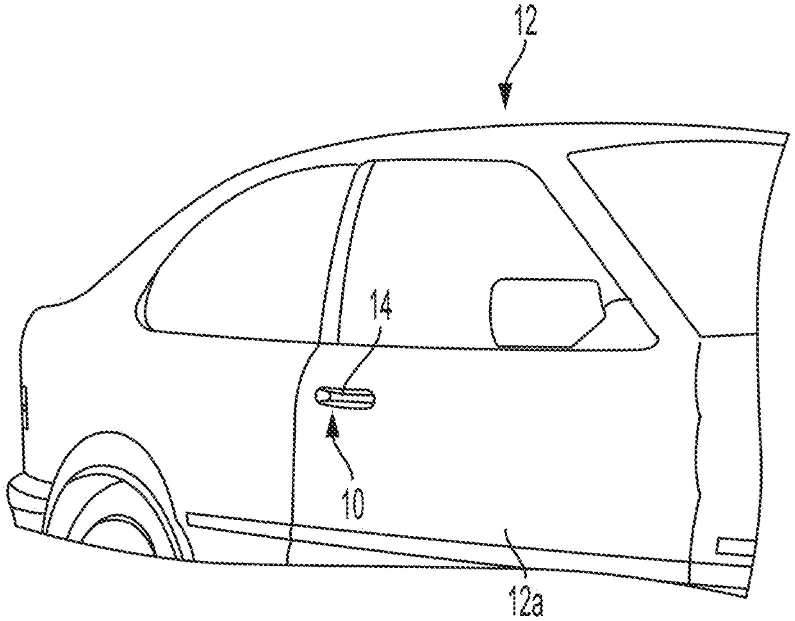
FIG. 1 is a perspective view of a vehicle with a door handle assembly mounted at a door of the vehicle.

Referring now to the drawings and the illustrative embodiments depicted therein, a vehicle door handle assembly 10 is mountable to a door 12*a* of a vehicle 12 and operable to release a latch mechanism (not shown) of the door 12*a* to open the vehicle door (FIG. 1). The vehicle door handle assembly 10 includes a handle portion 14 that is disposed at the door and that is fixedly mounted at the door or to a bracket or base portion mounted to the door. The handle portion 14 is fixedly mounted or attached at the door or the bracket, whereby a user may grasp or press or pull the handle portion 14 to actuate and release the latch mechanism to open the door. For example, the handle portion 14 (or the bracket at which the handle portion is mounted) may include a button or switch mechanism 18, whereby when the user grasps or presses or pulls the handle portion 14, the user actuates the button or switch mechanism 18 to release the latch mechanism to open the door 12*a*. The switch mechanism 18 may have an actuating element 24 at which a user applies pressure, where a multiple-ramped trigger element 26 disposed within the switch mechanism 18 is configured to actuate an electronic switch device or microswitch 28 of the switch mechanism 18 responsive to the pressure applied by the user. The multiple-ramped trigger element 26 allows for actuating the electronic switch device or microswitch 28 of the switch mechanism 18 via the user applying pressure substantially anywhere along an outer surface of the actuating element, as discussed below.

Figure 2:
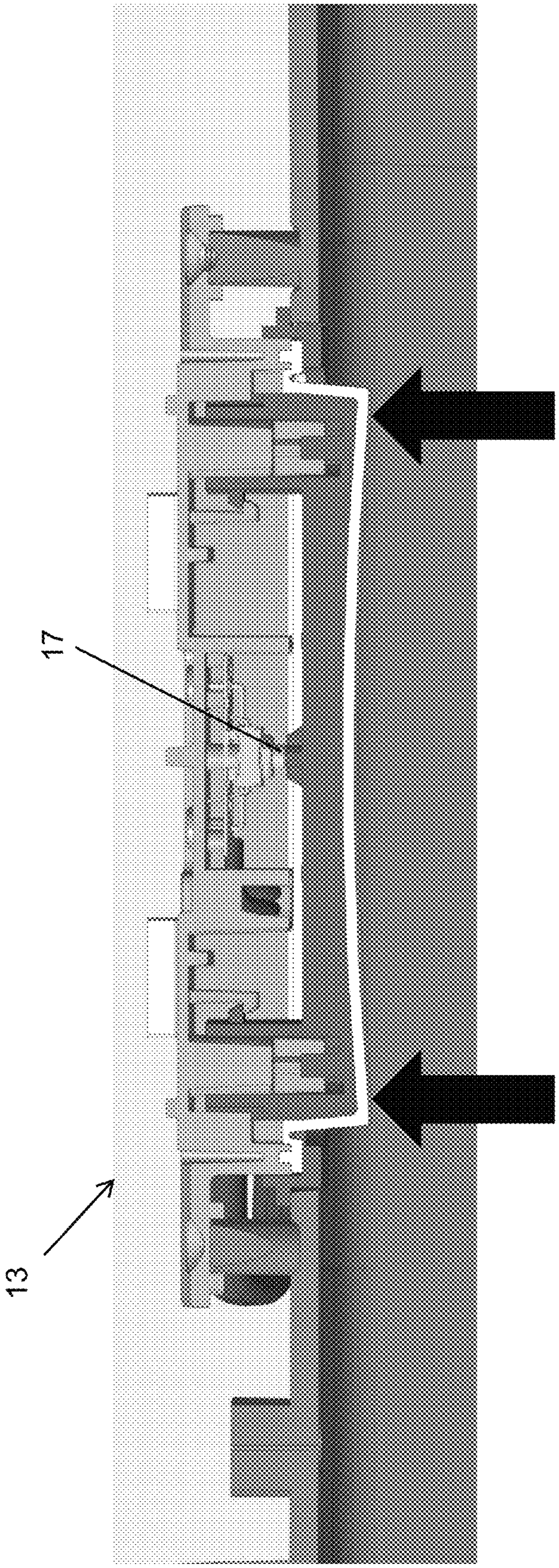
FIG. 2 is a sectional view of a door handle assembly.

Static door handles for vehicular doors, where a handle portion of the door handle assembly is static (i.e., non-movable or non-pivotable) or fixedly attached to a mounting or base portion of the door handle assembly, may be mounted at a vehicular door as a means for a user to actuate a latch mechanism to release a latch and open the vehicular door. Such static door handles may include e-latch static door handles, where a user grasps the static door handle portion and, when the user grasps the static door handle portion, the latch mechanism is electrically triggered to release the latch. For example, the user may press or actuate a button disposed at the static handle portion when the user grasps the static handle portion. Buttons on these handles and tailgates are desired to be large surfaces. This allows for quick and easy access to the vehicle as there is no searching for small buttons. However, some buttons for static door handles, such as that shown in FIG. 2, may have a relative large dead zone, where the dead zone may be defined by an area of the button that appears to be actuatable by the user, and where force applied by a user at the dead zone may move or compress the button but does not translate to activation of the button or switch. In other words, when the user applies pressure or force at the dead zone, the switch is not activated despite the user compressing the button. This may cause switch mis-triggers (where the button is not activated despite the user applying pressure at the button, or activation of the button may be delayed or require a forceful pressure from the user) and may be frustrating to users. As shown in FIG. 2, the traditional switch mechanism 13 includes a centrally located microswitch 17 that, when engaged by a pressable outer portion of the switch mechanism, may allow a user to open the door. However, as shown by the arrows of FIG. 2, pressure at the outer edges of the switch may not result in actuation of the microswitch. In other words, compressing the button at the outer edges may not activate the centrally located switch 17.

As shown in FIGS. 3-14, the door handle assembly 10 provides a switch mechanism that can be actuated by a user with reduced or minimal or eliminated dead zones. In other words, the user may apply pressure at substantially any position along the switch mechanism and the switch mechanism, responsive to the pressure applied by the user, will release or actuate the latch mechanism to open the vehicle door. The switch mechanism may be scaled to any size for any size static door handle application. The switch mechanism may be implemented on door handles having any suitable contoured surface, such as curved or flat handle surfaces. The switch mechanism is configured to have consistent response to forces across the whole surface of the switch mechanism.

The handle portion 14 may be fixedly mounted to the bracket or base portion mounted to the door or the handle portion 14 may be integrally formed with the bracket such that the handle portion 14 and bracket may be installed or mounted or attached or otherwise disposed at an exterior handle region of the vehicle door as a single unit. The switch mechanism 18 may be disposed in any suitable position at the handle portion 14 so that the switch mechanism 18, with the door handle assembly 10 mounted at the door 12*a* of the vehicle 12, is exposed exterior the door and accessible to a user so that a user may actuate the switch mechanism 18 by applying pressure at the switch mechanism.

Figure 3:
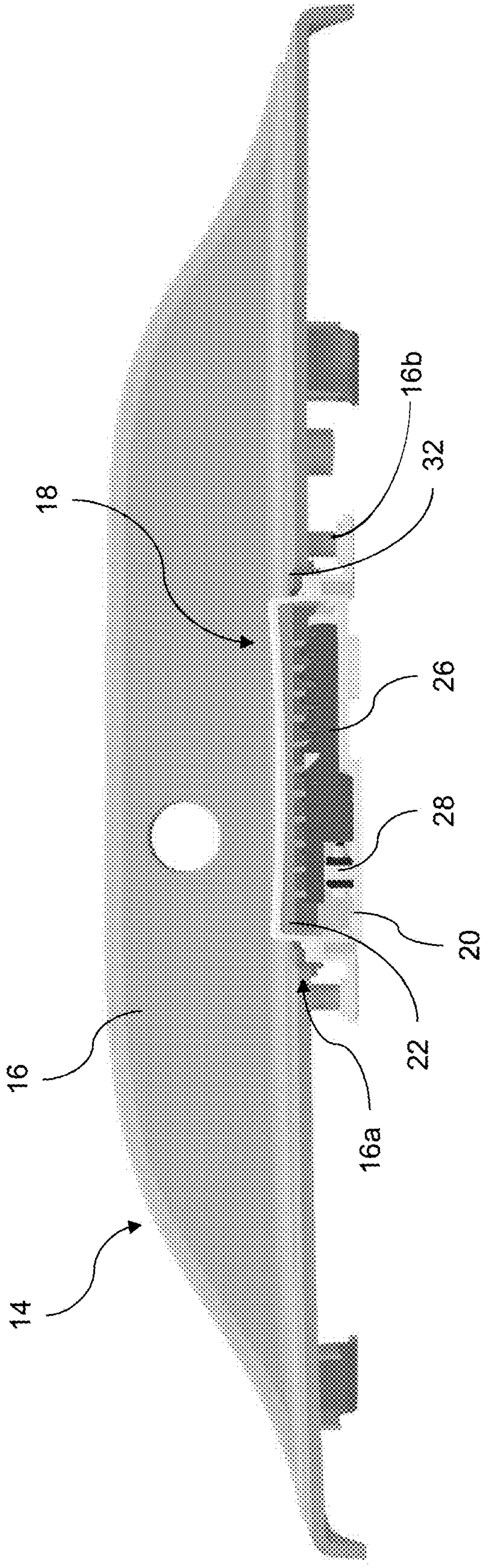
FIG. 3 is a sectional view of a handle portion of a door handle assembly with a switch mechanism.
Figure 4:
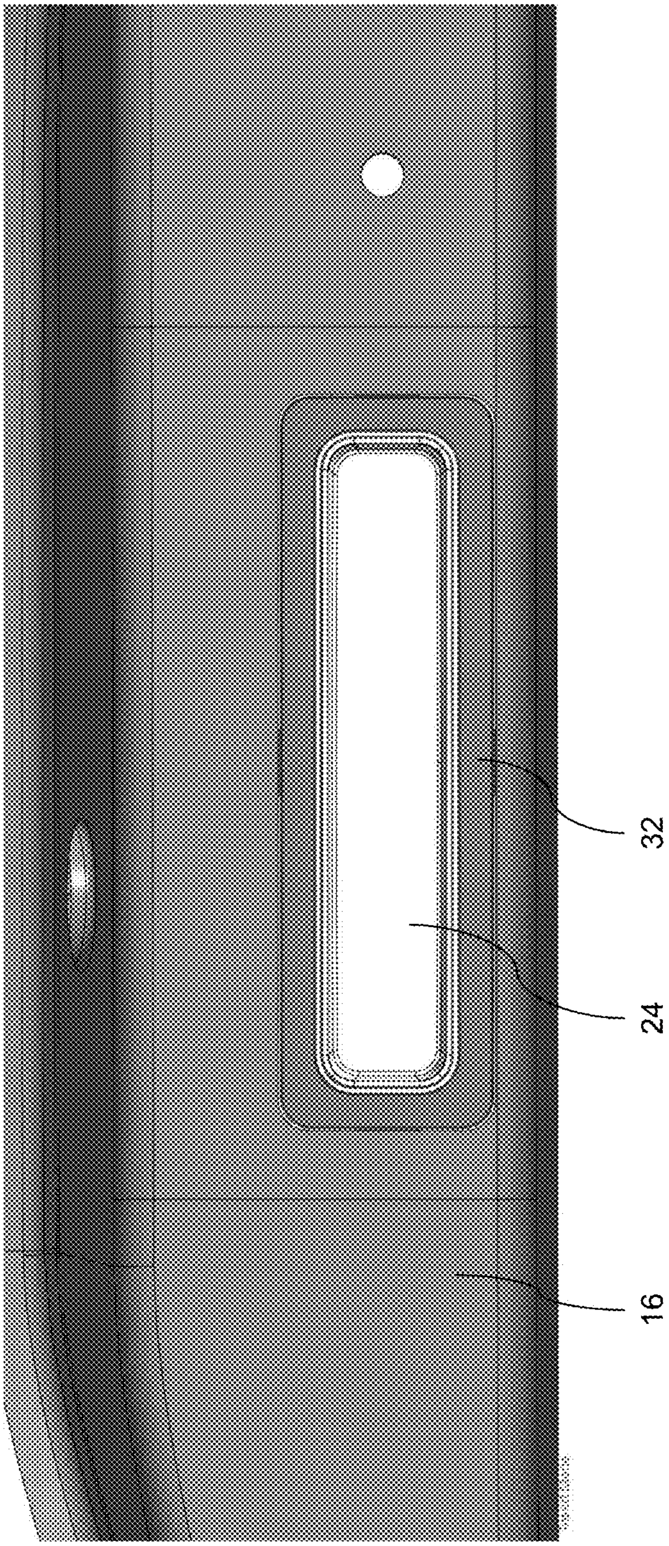
FIG. 4 is a partial plan view of the handle portion of FIG. 3, showing the engageable surface of the switch mechanism.

As shown in FIGS. 3 and 4, the handle portion 14 includes a bezel 16 and the switch mechanism 18 is inlaid or mounted or attached at the bezel 16 so that a portion of the switch mechanism 18 is exposed at an outer surface of the bezel 16 and a portion of the switch mechanism 18 is within or behind or disposed at an inner mounting surface 16*b* of the bezel 16, where the inner surface of the bezel may be disposed at an inner cavity of the door 12*a* of the vehicle (such as within a door panel). The bezel 16 includes an aperture 16*a*, where a portion of the switch mechanism mounts to the inner mounting surface 16*b* of the bezel, such as via screws or other suitable fasteners, and the user actuatable portion or actuating element 24 of the switch mechanism protrudes through or is exposed at the aperture 16*a* so that the user may apply pressure to actuate the switch mechanism 18.

The switch mechanism 18 includes a push housing that includes an inner housing portion 20 and an outer housing portion 22. The inner housing 20 may be fixedly attached at the inner mounting surface 16*b* of the bezel 16 and the outer housing 22 may be movably attached at the inner housing 20 and protrudes through or is disposed at the aperture 16*a* of the bezel 16. The actuating element or cover element 24 is disposed at or is integral with the outer housing portion 22. The multi-ramped trigger element 26, the electronic switch 28 (such as a microswitch), and a biasing member or spring 30 are disposed within the push housing between the inner housing 20 and the outer housing 22. A trim portion or element 32 may be disposed at the aperture 16*a* of the bezel 16 and circumscribe the aperture 16*a*, and may optionally be integrally formed with the portion of the bezel 16 defining the aperture 16*a*. The switch mechanism 18 is configured to receive a pressure or touch or force from a user and translate the input received from the user into actuation of the microswitch 28, whereby the latch mechanism of the door is released. The switch mechanism 18 is configured to receive and respond to the user input at any position of the switch mechanism exposed exterior the vehicle, thus eliminating or reducing dead zones.

The outer housing 22 mounts or attaches at the inner housing 20 and extends through the aperture 16*a* of the bezel 16 to be exposed exterior the vehicle. The actuating element 24 may be disposed at an outer surface of the outer housing 22 and attach at the inner housing 20 or the trim element 32 to protect the switch mechanism from the environment exterior the vehicle. The user applies pressure at the actuating element 24 and the outer housing 22 to actuate the switch mechanism and the outer housing 22 moves or compresses into or toward the inner housing 20 when the user input or force is applied or received at the switch mechanism 18.

Figure 5:
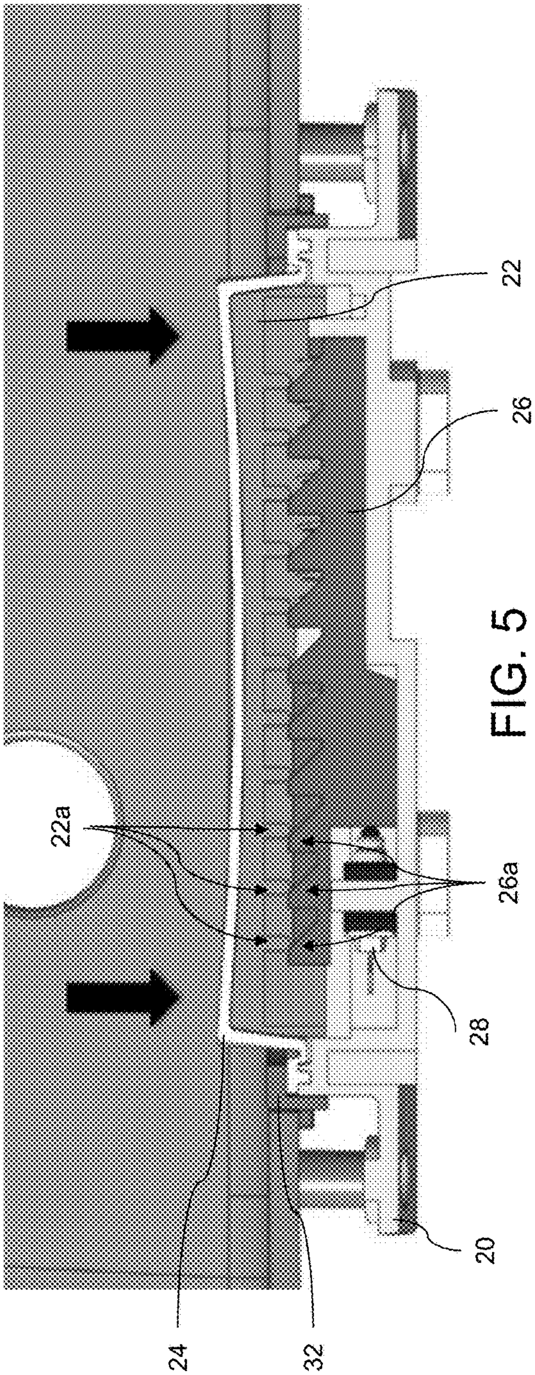
FIG. 5 is a sectional view of the switch mechanism of FIG. 3, where the switch mechanism is in a default or extended state.
Figure 6:
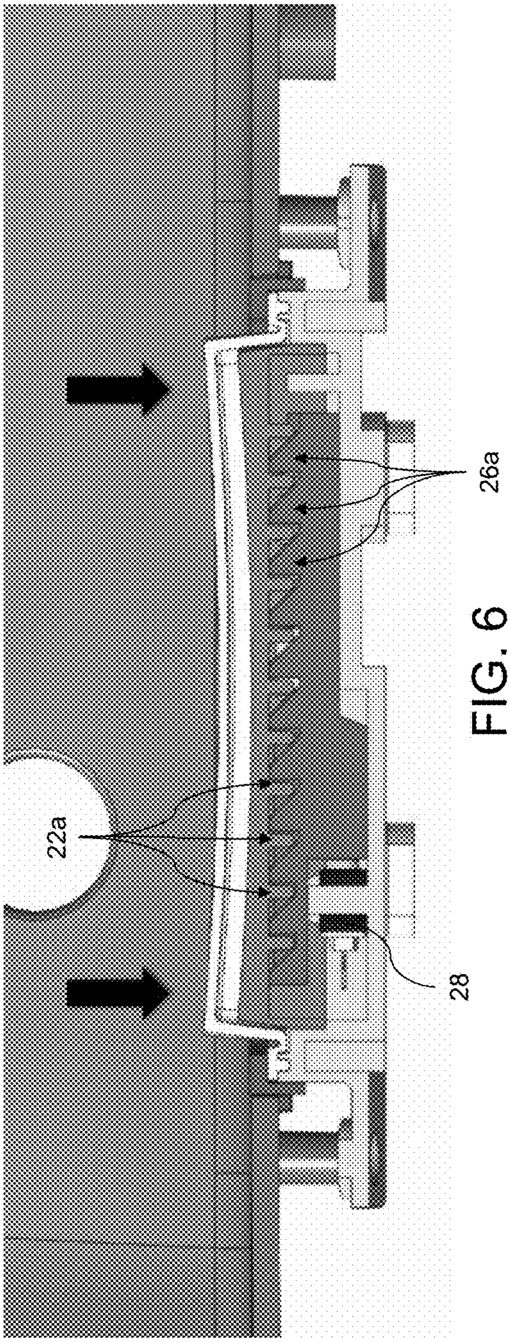
FIG. 6 is a sectional view of the switch mechanism of FIG. 3, where the switch mechanism is in an engaged or depressed state.

As shown in FIGS. 5-8, the trigger 26 is disposed between the outer housing 22 and the inner housing 20 and includes an array or series of ramps 26*a* across the length of the trigger 26. The array of ramps 26*a* correspond to an array or series of protrusions or teeth 22*a* extending or protruding from an inner surface of the outer housing 22, where each protrusion 22*a* is configured to engage a corresponding ramp 26*a* of the trigger 26. The protrusions 22*a* and ramps 26*a* are configured so that, when the outer housing 22 is in an extended or not actuated state (i.e., not pressed by a user, such as shown in FIG. 5), the protrusions 22*a* are positioned at or near the top or peak of corresponding ramps 26*a* and, when the outer housing 22 is in a depressed or actuated state (i.e., when pressed by a user, such as shown in FIG. 6), the protrusions 22*a* have travelled along the ramps 26*a* and are positioned at or near or toward the bottom or depression of corresponding ramps 26*a*. Thus the housing is movable or compressible between an extended state, where the outer housing 22 and inner housing 20 are at a default position relative to one another and define an interior volume of the housing, and a depressed or compressed or actuated state, where the pressure or force from the user input moves the outer housing toward or into the inner housing, thus reducing the interior volume of the housing and causing the protrusions of the outer housing to move along the trigger element, which in turn causes the trigger element 26 to translate in a direction along the housing.

In other words, as the outer housing 22 moves into or toward the inner housing 20, the trigger element 26 moves laterally within the housing to actuate the microswitch 28.

The lateral movement of the trigger element 26 relative to the compression of the outer housing 22 reduces the necessary footprint of the switch mechanism 18 and ensures that an input at any position along the outer housing 22 that causes the outer housing 22 to compress inward (i.e., to move in a cross-vehicle direction) will cause the trigger element 26 to translate laterally relative to the inward movement (i.e., to move in a direction along a longitudinal axis of the vehicle or in a vertical direction or other direction that is generally normal or perpendicular to the inward compression direction) and actuate the microswitch. The trigger element 26 may move in a direction at any suitable non-zero angle relative to the direction of movement of the outer housing 22, such as at an angle that is between 45 degrees and 135 degrees relative to the movement of the outer housing 22, such as between 80 degrees and 100 degrees. Optionally, the trigger element 26 may move in a direction that is perpendicular or substantially perpendicular (i.e., at a 90 degree angle or at a substantially 90 degree angle) relative to the direction of movement of the outer housing 22.

Although the switch mechanism 18 is shown with the trigger element 26 including the series of ramps and the outer housing 22 including the series of protrusions engaging and travelling along the ramps, it should be understood that the outer housing 22 may include a series of ramps and the trigger element 26 may include a series of corresponding protrusions. Optionally, both the outer housing and the trigger element may include corresponding series of ramps that engage and travel along each other when the outer housing is pressed by a user. Any suitable interface that translates pressure or force from the user at the outer housing (and resulting inward movement of the outer housing) to lateral movement of the trigger element within the housing may be employed.

Figure 7:
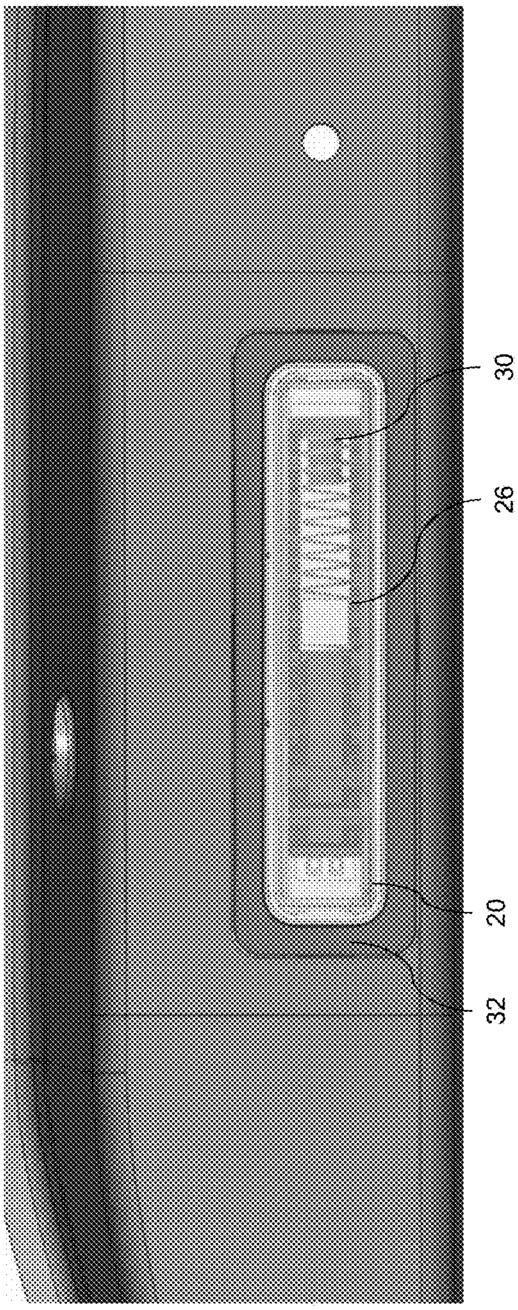
FIG. 7 is a partial plan view of the handle portion of FIG. 3, with the outer housing of the switch mechanism removed and where the switch mechanism is in the default or extended state.
Figure 8:
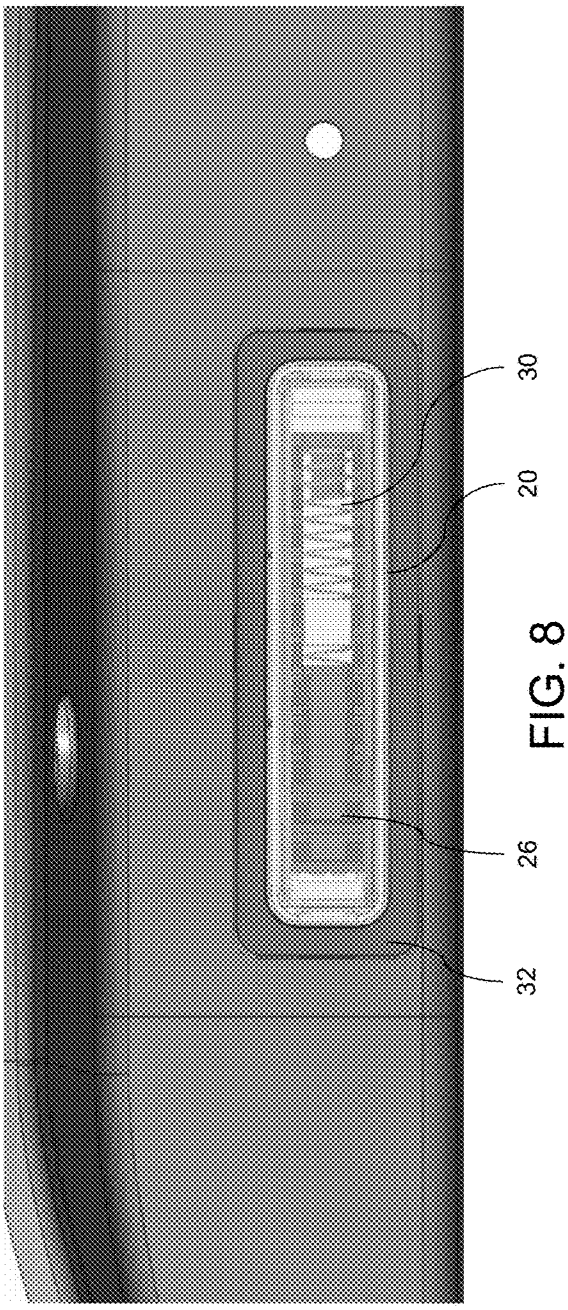
FIG. 8 is a partial plan view of the handle portion of FIG. 3, with the outer housing of the switch mechanism removed and where the switch mechanism is in the engaged or depressed state.
Figure 9:
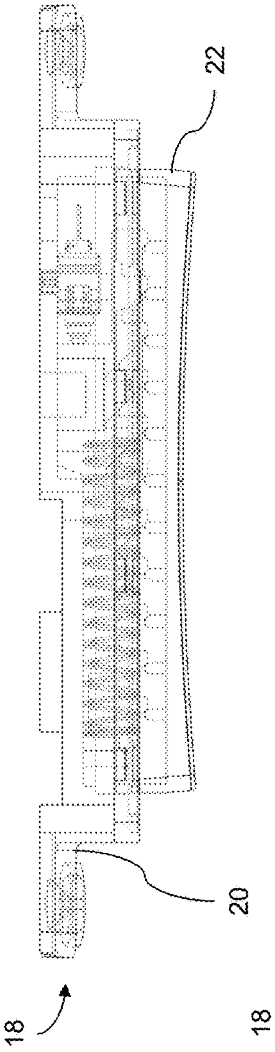
FIGS. 9-12 are sectional views of the switch mechanism of FIG. 3, where the switch mechanism is in the default or extended state in FIGS. 9 and 11, and the switch mechanism is in the engaged or depressed state in FIGS. 10 and 12.
Figure 10:
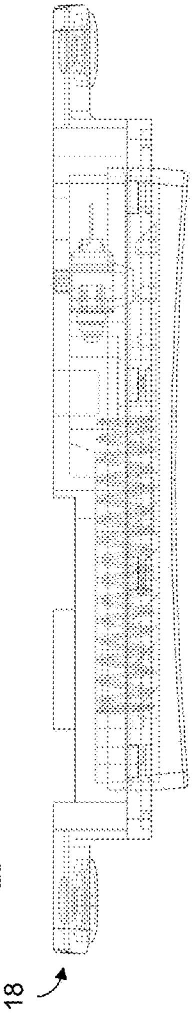
Figure 11:
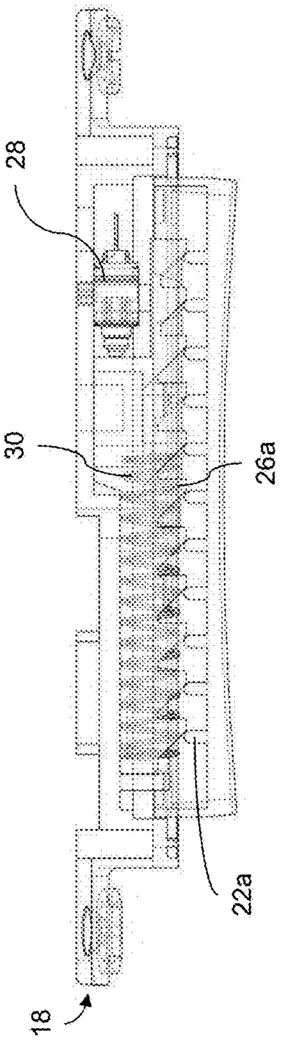
Figure 12:
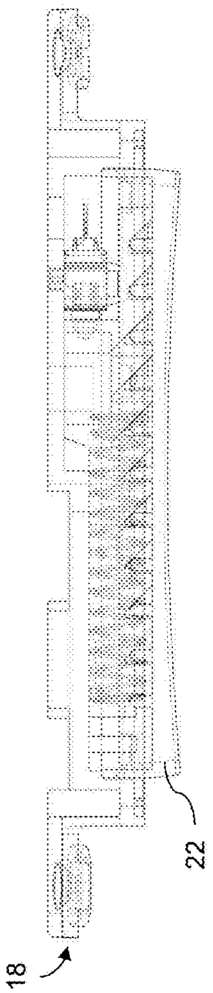
Figure 13:
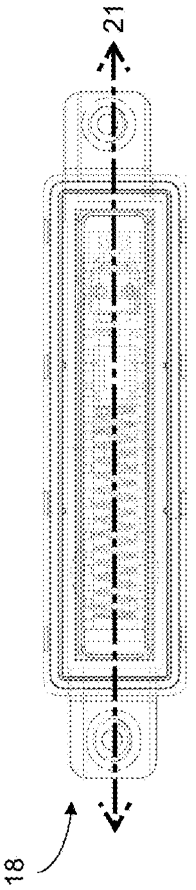
FIG. 13 is a sectional view of the switch mechanism of FIG. 3.
Figure 14:
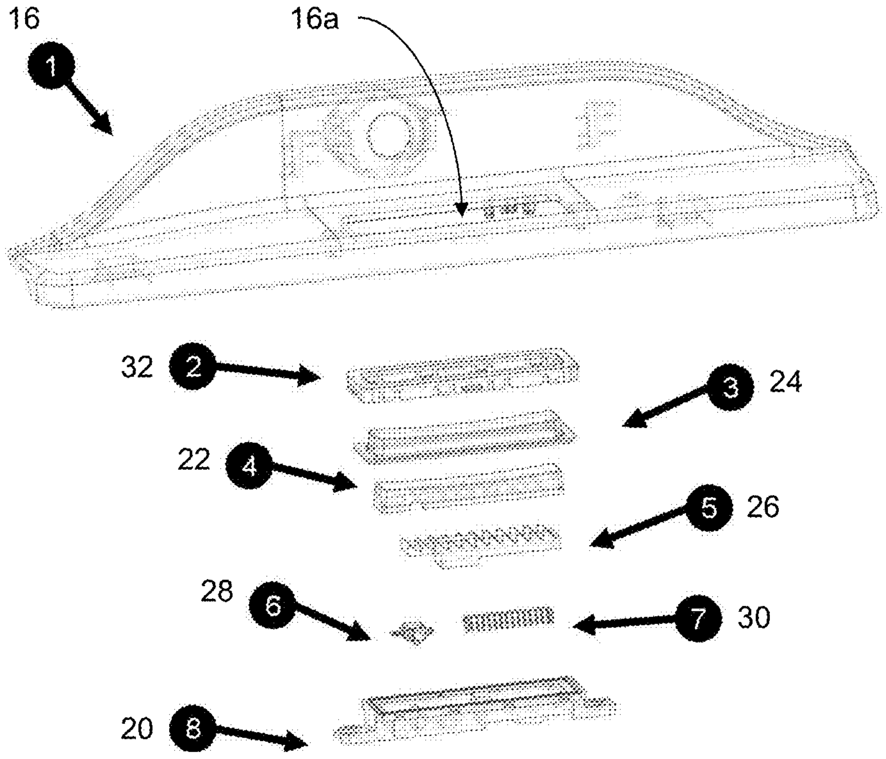
FIG. 14 is an exploded view of the handle portion and switch mechanism of FIG. 3.

When the actuating element 24 and outer housing 22 receive the user input, the force from the user input depresses at least a portion of the outer housing 22 toward and optionally into at least a portion of the inner housing 20 fixedly mounted at the bezel. The movement of the outer housing 22 toward the inner housing 20, with the protrusions **22*a* engaging the ramps 26*a*, causes the protrusions 22*a* to travel along the ramps 26*a*. As the protrusions 22*a* travel along the ramps 26*a*, and because lateral movement of the protrusions and the outer housing is limited, the trigger element 26 is translated or moved laterally within the inner housing 20 by the force of the protrusions 22*a* travelling along the ramps 26*a*. In other words, the force of the user input is transferred to lateral or longitudinal movement of the trigger element 26. The trigger element may move along a longitudinal axis 21 of the housing (as shown in FIG. 13) that is generally perpendicular or normal to movement of the outer housing 22 relative to the inner housing 20. For example, in FIGS. 5 and 6, as the outer housing 22 moves downward relative to the inner housing 20, the trigger element 26 moves to the left and actuates the microswitch 28. FIGS. 7 and 8 depict the switch mechanism 18 and show the lateral movement of the trigger element 26 within the housing as the switch mechanism is engaged and moves between the default or extended state (FIG. 7) and the engaged or depressed state (FIG. 8**).

Because the protrusions **22*a* and ramps 26*a* are spaced along the length of the switch mechanism 18, the user input may be received at virtually any position along the actuating element and/or outer housing 22 to cause lateral movement of the trigger 26. Engagement of one or more protrusions 22*a* with one or more ramps 26*a* is sufficient to cause lateral movement of the trigger 26. Thus, a user need not provide the input at the center of the actuating element 24 and outer housing 22 or substantially across the length of the outer housing 22 to actuate the switch mechanism. A user input at substantially any position along the actuating element 24 and outer housing 22 causes the motion of the protrusions 22*a* necessary to engage the ramps 26*a* and move the trigger 26 laterally to actuate the switch mechanism 18**.

The lateral movement of the trigger 26 within the inner housing 20 depresses or engages or actuates the microswitch 28. The microswitch may be disposed within a recess or cavity **26*b* of the trigger 26 between the ramps 26*a* and a surface of the inner housing 20 so as to not reduce the area of the switch mechanism 18 where the ramps 26*a* may be disposed. The microswitch 28 may be electrically connected to the latch mechanism of the door, such as via an electrical connection at the switch mechanism 18, so that actuation of the microswitch 28** releases the latch mechanism to open the door.

The spring 30 may also be disposed within or along the trigger 26, where the spring 30 biases or urges the trigger along the longitudinal axis 21 toward the extended state. Thus, when the actuating element 24 is pressed or moved by the user input, the trigger translates along the actuating element in a direction against the spring force (e.g., in a direction that compresses the coil spring). After receiving the user input to actuate the microswitch 28, the spring biases or urges the trigger 26 in the opposite lateral direction to move the trigger back to its initial position, which moves the protrusions **22*a* back along the ramps 26*a* and thus back toward the extended state where the actuating element at the outer housing 22 is positioned to receive another user input. Because the spring 30 biases the protrusions 22*a* outward along the ramps 26*a*, the user input must overcome the biasing force of the spring 30 to actuate the switch mechanism 18. This prevents false or unintended actuation of the switch mechanism 18, such as due to unintended grasping of the handle portion. The spring 30** may be configured to provide a desired biasing force.

Optionally, the ramps **26*a* and protrusions 22*a* may also be shaped or configured or otherwise optimized as desired. For example, a steeper slope of the ramps 26*a* may result in easier actuation of the latch mechanism 18 as the protrusions 22*a* travel along the ramps, but more difficult biasing of the outer housing 22 toward the extended state as the protrusions travel back up the ramps. Furthermore, the protrusions 22*a* may have shaped or curved or rounded ends to assist in smoother travel of the protrusions 22*a* along the ramps 26*a***.

In the illustrated example, the outer housing 22 has a slightly concave outer surface at which the user input is received, with the actuation element 24 conforming to the outer surface of the outer housing 22. Optionally, the outer housing 22 (and optionally the seal or cover or actuating element 24 at the outer housing 22) may be shaped or configured in any suitable manner. For example, the outer housing 22 may be configured to be flush with or substantially conform to an outer surface of the door at the handle portion, such as a curved or flat outer surface of the door or handle portion. Optionally, the outer housing 22 may be recessed from or protrude at least slightly from the outer surface of the door at the handle portion. The seal or cover or actuating element 24 may be a separate component with the outer housing 22 or may be integrated with the outer housing 22.

Thus, the door handle assembly provides a sealed switch that is scalable to any size application, provides consistent push effort across the surface of the switch, may fit a tight or small or reduced packaging space, provides a universal design that is applicable to both the passenger side and the driver side of the vehicle, and provides hard stops with large surface areas for added durability of the switch. The switch mechanism is integrated or otherwise disposed at a static door handle assembly where the handle portion of the door handle assembly is fixedly attached and non-pivotable relative to a bracket or base portion or the door. When the user grasps or presses or pulls the handle portion, the user applies a force or input at the switch mechanism and actuates the switch mechanism to release the latch mechanism to open the door. The switch mechanism includes an outer portion or housing that receives the user input and protrusions of the outer portion engage ramps of a trigger element of the switch mechanism and travel along the ramps when the outer housing portion receives the user input. As the protrusions travel along the ramps, the trigger element moves laterally and engages a microswitch to actuate the microswitch to release the latch mechanism to open the door. The switch mechanism may include a spring or biasing element to bias the protrusions back along the ramps and bias the outer housing from a depressed state toward an extended state. Optionally, the protrusions of the outer housing portion may comprise ramped surfaces and the trigger element may comprise non-ramped protrusions. Optionally, both the outer housing portion and the trigger element may comprise correspondingly ramped surfaces.

The door handle assembly 10 may comprise any suitable type of door handle assembly, and may include or incorporate aspects of the door handle assemblies described in U.S. Pat. Nos. 6,349,450; 6,550,103; 6,907,643; 7,407,203; 8,786,401; 8,801,245 and/or 8,333,492, and/or U.S. Publication Nos. US-2010-0088855 and/or US-2010-0007463, which are hereby incorporated herein by reference in their entireties. The handle assembly may comprise any suitable type of vehicle door handle assembly, such as a strap type vehicle door handle assembly (having a strap mounted at the door and where the switch mechanism is disposed on the strap or the base portion mounted at the door) or such as a paddle type vehicle door handle assembly (having a paddle or the like where the switch mechanism is disposed at the paddle) or other type of vehicle door handle assembly such that the switch mechanism is engageable by a user exterior the vehicle. For example, the switch mechanism may be disposed at a strap type vehicle door handle, where the actuation element is exposed at any exterior surface of the strap mounted at the door, such as an inward-facing exterior surface of the strap facing inward toward the vehicle door or an outward-facing exterior surface of the strap facing outward away from the vehicle door. Optionally, the switch mechanism may be disposed at an outer surface of the vehicle door, such that the actuation element is exposed at an exterior surface of the door along the side of the vehicle or the actuation element may be exposed at an exterior surface of the door within a pocket of the door and thus recessed from the side of the vehicle.

The door handle assembly is thus operable to open the vehicle door when a user grasps the door handle portion at the side of the vehicle door. The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the door handle assembly may include a soft touch handle portion, such as utilizing the principles described in U.S. Pat. Nos. 6,349,450; 6,550,103 and/or 6,907,643, which are hereby incorporated herein by reference in their entireties. Optionally, the door handle assembly may include an antenna or the like, such as for sensing or transmitting signals, such as described in U.S. Pat. No. 6,977,619, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a base portion configured to mount at a door of a vehicle equipped with the vehicular exterior door handle assembly;

a handle portion mounted at the base portion;

a switch mechanism disposed at the handle portion;

wherein the switch mechanism comprises a trigger element movably disposed within a housing;

wherein the housing includes an inner portion and an outer portion, and wherein, when a force is applied at the outer portion, the outer portion moves in a first direction toward the inner portion;

wherein the outer portion of the housing is configured to engage the trigger element as the outer portion moves towards the inner portion;

wherein, as the outer portion moves toward the inner portion and the outer portion engages the trigger element, the trigger element moves within the housing in a second direction at an angle relative to the first direction and engages a microswitch disposed within the housing to actuate the switch mechanism;

wherein the outer portion of the housing comprises a plurality of protrusions arranged in a longitudinal direction of the outer portion, and wherein the trigger element comprises a plurality of protrusions arranged in a longitudinal direction of the trigger element, and wherein the plurality of protrusions of the outer portion of the housing extend toward the plurality of protrusions of the trigger element;

wherein, as the outer portion moves toward the inner portion, at least one protrusion of the plurality of protrusions of the outer portion engages at least one protrusion of the plurality of protrusions of the trigger element; and wherein, with the base portion mounted at the door of the vehicle, the switch mechanism, when actuated, operates to release a latch mechanism of the door to open the door.

2. The vehicular exterior door handle assembly of claim 1, wherein the plurality of protrusions of the trigger element comprise ramped protrusions, and wherein, as the outer portion moves toward the inner portion, the plurality of protrusions of the outer portion of the housing engage ramped surfaces of the ramped protrusions.

3. The vehicular exterior door handle assembly of claim 1, wherein the plurality of protrusions of the outer portion of the housing comprise ramped protrusions, and wherein, as the outer portion moves toward the inner portion, the plurality of protrusions of the trigger element engage ramped surfaces of the ramped protrusions.

4. The vehicular exterior door handle assembly of claim 3, wherein the plurality of protrusions of the trigger element comprise ramped protrusions, and wherein, as the outer portion moves toward the inner portion, ramped surfaces of the ramped protrusions of the trigger element engage ramped surfaces of the ramped protrusions of the outer portion of the housing.

5. The vehicular exterior door handle assembly of claim 1, wherein the plurality of protrusions of the outer portion of the housing are spaced from one another so as to span a length of the outer portion of the housing.

6. The vehicular exterior door handle assembly of claim 5, wherein the plurality of protrusions of the trigger element are spaced from one another so as to span a length of the trigger element corresponding to the length of the outer portion of the housing.

7. The vehicular exterior door handle assembly of claim 5, wherein at least part of the outer portion of the housing is engageable by a user to apply the force to actuate the switch mechanism, and wherein the at least part of the outer portion of the housing engageable by the user corresponds to the length of the outer portion of the housing.

8. The vehicular exterior door handle assembly of claim 1, wherein the switch mechanism comprises a biasing element, and wherein the biasing element biases the trigger element away from engagement with the microswitch.

9. The vehicular exterior door handle assembly of claim 1, wherein the second direction is along a longitudinal axis of the housing.

10. The vehicular exterior door handle assembly of claim 1, wherein, with the vehicular exterior door handle assembly mounted at the vehicle, the force is applied when a user grasps the handle portion.

11. The vehicular exterior door handle assembly of claim 1, wherein, with the vehicular exterior door handle assembly mounted at the vehicle, the outer portion of the housing is exposed exterior the vehicle.

12. The vehicular exterior door handle assembly of claim 1, wherein the handle portion comprises an aperture, and wherein the switch mechanism is mounted at the handle portion so the outer portion of the housing protrudes through the aperture.

13. The vehicular exterior door handle assembly of claim 12, wherein a cover element is disposed at an outer surface of the outer portion of the housing so that no portion of the outer housing is exposed exterior the vehicle.

14. The vehicular exterior door handle assembly of claim 1, wherein the angle of the second direction relative to the first direction is between 80 degrees and 100 degrees.

15. The vehicular exterior door handle assembly of claim 1, wherein the angle of the second direction relative to the first direction is 90 degrees.

16. A vehicular exterior door handle assembly, the vehicular exterior door handle assembly comprising:

- a base portion configured to mount at a door of a vehicle equipped with the vehicular exterior door handle assembly;
- a handle portion mounted at the base portion;
- a switch mechanism disposed at the handle portion;
- wherein the switch mechanism comprises a trigger element movably disposed within a housing;
- wherein the housing includes an inner portion and an outer portion, and wherein, when a force is applied at the outer portion, the outer portion moves in a first direction toward the inner portion;
- wherein the outer portion of the housing is configured to engage the trigger element as the outer portion moves towards the inner portion;
- wherein, as the outer portion moves toward the inner portion and the outer portion engages the trigger element, the trigger element moves within the housing in a second direction relative to the first direction and engages a microswitch disposed within the housing to actuate the switch mechanism, and wherein the second direction is along a longitudinal axis of the housing;
- wherein the outer portion of the housing comprises a plurality of protrusions arranged in a longitudinal direction of the outer portion, and wherein the trigger element comprises a plurality of protrusions arranged in a longitudinal direction of the trigger element, and wherein the plurality of protrusions of the outer portion of the housing extend toward the plurality of protrusions of the trigger element;
- wherein, as the outer portion moves toward the inner portion, at least one protrusion of the plurality of protrusions of the outer portion engages at least one protrusion of the plurality of protrusions of the trigger element; and
- wherein, with the base portion mounted at the door of the vehicle, the switch mechanism, when actuated, operates to release a latch mechanism of the door to open the door.

17. The vehicular exterior door handle assembly of claim 16, wherein the plurality of protrusions of the trigger element comprise ramped protrusions, and wherein, as the outer portion moves toward the inner portion, the plurality of protrusions of the outer portion of the housing engage ramped surfaces of the ramped protrusions.

18. The vehicular exterior door handle assembly of claim 16, wherein the plurality of protrusions of the outer portion of the housing comprise ramped protrusions, and wherein, as the outer portion moves toward the inner portion, the plurality of protrusions of the trigger element engage ramped surfaces of the ramped protrusions.

19. The vehicular exterior door handle assembly of claim 18, wherein the plurality of protrusions of the trigger element comprise ramped protrusions, and wherein, as the outer portion moves toward the inner portion, ramped surfaces of the ramped protrusions of the trigger element engage ramped surfaces of the ramped protrusions of the outer portion of the housing.

20. The vehicular exterior door handle assembly of claim 16, wherein the plurality of protrusions of the outer portion of the housing are spaced from one another so as to span a length of the outer portion of the housing.

21. The vehicular exterior door handle assembly of claim 20, wherein the plurality of protrusions of the trigger element are spaced from one another so as to span a length of the trigger element corresponding to the length of the outer portion of the housing.

22. The vehicular exterior door handle assembly of claim 16, wherein the handle portion comprises an aperture, and wherein the switch mechanism is mounted at the handle portion so the outer portion of the housing protrudes through the aperture.

23. The vehicular exterior door handle assembly of claim 16, wherein the second direction is perpendicular relative to the first direction.

24. A vehicular exterior door handle assembly, the vehicular exterior door handle assembly comprising:

a base portion configured to mount at a door of a vehicle equipped with the vehicular exterior door handle assembly;

a handle portion mounted at the base portion;

a switch mechanism disposed at the handle portion;

wherein the switch mechanism comprises a trigger element movably disposed within a housing;

wherein the housing includes an inner portion and an outer portion, and wherein, when a force is applied at the outer portion, the outer portion moves in a first direction toward the inner portion;

wherein the outer portion of the housing is configured to engage the trigger element as the outer portion moves towards the inner portion;

wherein, as the outer portion moves toward the inner portion and the outer portion engages the trigger element, the trigger element moves within the housing in a second direction at an angle relative to the first direction and engages a microswitch disposed within the housing to actuate the switch mechanism, and wherein the angle of the second direction relative to the first direction is between 80 degrees and 100 degrees;

wherein the outer portion of the housing comprises a plurality of protrusions arranged in a longitudinal direction of the outer portion, and wherein the trigger element comprises a plurality of protrusions arranged in a longitudinal direction of the trigger element, and wherein the plurality of protrusions of the outer portion of the housing extend toward the plurality of protrusions of the trigger element;

wherein, as the outer portion moves toward the inner portion, at least one protrusion of the plurality of protrusions of the outer portion engages at least one protrusion of the plurality of protrusions of the trigger element;

wherein the plurality of protrusions of the outer portion of the housing comprise ramped protrusions, and wherein the plurality of protrusions of the trigger element comprise ramped protrusions, and wherein, as the outer portion moves toward the inner portion, ramped surfaces of the ramped protrusions of the trigger element engage ramped surfaces of the ramped protrusions of the outer portion of the housing; and wherein, with the base portion mounted at the door of the vehicle, the switch mechanism, when actuated, operates to release a latch mechanism of the door to open the door.

25. The vehicular exterior door handle assembly of claim 24, wherein the plurality of protrusions of the outer portion of the housing are spaced from one another so as to span a length of the outer portion of the housing.

26. The vehicular exterior door handle assembly of claim 25, wherein the plurality of protrusions of the trigger element are spaced from one another so as to span a length of the trigger element corresponding to the length of the outer portion of the housing.

27. The vehicular exterior door handle assembly of claim 24, wherein the second direction is along a longitudinal axis of the housing.

28. The vehicular exterior door handle assembly of claim 24, wherein, with the vehicular exterior door handle assembly mounted at the vehicle, the force is applied when a user grasps the handle portion.

29. The vehicular exterior door handle assembly of claim 24, wherein the angle of the second direction relative to the first direction is 90 degrees.

* * * * *